United States Patent
Montagnino et al.

(10) Patent No.: US 6,646,209 B2
(45) Date of Patent: Nov. 11, 2003

(54) BEAM SCALE WITH USER FRIENDLY FEATURES

(75) Inventors: James G. Montagnino, St. Charles, IL (US); Anson Wong, Glendale Heights, IL (US); Ricardo Murguia, Berwyn, IL (US); Shawn Barrett, Grayslake, IL (US); Curtis L. Cruver, IV, Elmhurst, IL (US)

(73) Assignee: Pelstar, L.L.C., Bridgeview, IL (US)

( * ) Notice: Subject to any disclaimer, the term of this patent is extended or adjusted under 35 U.S.C. 154(b) by 24 days.

(21) Appl. No.: 09/835,247

(22) Filed: Apr. 13, 2001

(65) Prior Publication Data

US 2002/0148654 A1 Oct. 17, 2002

(51) Int. Cl.$^7$ ................................................ G01G 1/36
(52) U.S. Cl. ........................ 177/126; 177/171; 177/246; 177/247; 33/512
(58) Field of Search ................................. 177/171, 173, 177/174, 167, 247, 126, 127, 240, 246, 157, 158, 159; 33/512, 484, 488, 483, 809

(56) References Cited

U.S. PATENT DOCUMENTS

| | | | | |
|---|---|---|---|---|
| 1,383,505 A | * | 7/1921 | Weber | 177/247 |
| 2,539,570 A | * | 1/1951 | Cousineau | 177/126 |
| 3,031,021 A | * | 4/1962 | Hale et al. | 177/173 |
| 3,596,725 A | * | 8/1971 | Homs | 177/126 |
| 3,743,040 A | * | 7/1973 | Hutchinson et al. | 177/126 |
| 3,995,708 A | * | 12/1976 | Hutchinson et al. | 177/126 |
| 4,196,521 A | * | 4/1980 | Hutchinson et al. | 33/512 |
| 4,750,575 A | * | 6/1988 | Carnevale et al. | 177/241 |
| 4,836,315 A | * | 6/1989 | Lee | 177/247 |
| 4,893,685 A | * | 1/1990 | Bergman et al. | 177/174 |
| 4,928,398 A | * | 5/1990 | Delfiner | 33/512 |
| 5,317,813 A | * | 6/1994 | Reed | 33/488 |

\* cited by examiner

Primary Examiner—Randy Gibson
(74) Attorney, Agent, or Firm—Wallenstein & Wagner, Ltd.

(57) ABSTRACT

A beam scale for measurement of body weight and height according to the present invention includes a frame and a weighing mechanism. The frame includes a base assembly, a pillar assembly, and a horn assembly. The weighing mechanism is housed within the frame and includes a beam, weights, and a lever assembly. The horn assembly may include a transparent holding bracket having a level indicator. The scale may include a height measurement assembly having a height rod, a sheath supported by the horn assembly and the pillar assembly, a measuring arm, and a transparent height-measuring window having a line indicator. The frame may include a quick assembly mechanism to secure the pillar assembly to the base assembly during final assembly, quiet wheels for transport, and/or handle bars to support the user. Much of the frame may be made of pigmented thermoplastic or thermoset materials to reduce manufacturing costs and scale weight.

5 Claims, 6 Drawing Sheets

BEAM SCALE WITH USER FRIENDLY FEATURES

FIELD OF THE INVENTION

The present invention relates to a beam scale for measurement of body weight and height

BACKGROUND INFORMATION

Conventional beam scales are a common fixture in health facilities, whether a doctor's office or a health club. In contrast to spring-loaded and load cell-equipped scales, which measure the effect of gravity on a mass applied to the scale, beam scales actually measure the mass itself by balancing the object of unknown mass against objects of known mass. That being said, the concept of weighing as used herein will encompass both measuring an object's mass and weight, because the force of gravity is assumed to be constant for purposes of this description.

In balancing the two masses, the object of unknown mass generally is the user, while the objects of known mass typically are metal weights, each positionable along an extension of a looped or forked beam having a pointer at a far end. Typically, the beam rests on a fulcrum at a near end, with the mass of the longer side of the beam toward the far end being offset by an adjustable counterweight on the near end. When the scale is unburdened and the metal weights are flush with the near end, the counterweight is adjusted until the beam balances the pointer at a level indicator, thereby calibrating the scale. The level indicator is located on a holding bracket attached to a frame of the scale. The holding bracket also limits the range of motion of the pointer and hence the beam itself, keeping it from shooting upward (and potentially into a user's face) when the user steps on the scale. Once properly calibrated, the scale is ready for use. When not in use and with the weights flush with the near end, a calibrated scale is resting in the "zero" position as the beam is balanced at a zero degree incline.

When a user stands on a platform on the scale, the platform exerts pressure on a series of levers within the frame which pull downward on the near end of the beam beyond the fulcrum, changing the equilibrium of the beam against the fulcrum, causing the far end of the beam to move upward and bang into the holding bracket. As the weights are slid along the extensions of the beam from the near end to the far end, the leverage the weights exert on the beam increases, causing the beam to move back downward, until the pointer levels off. If the weights are moved too far, they cause the pointer to move too far downward and beyond the balancing point. The user's weight (or mass, in this case) may be read from the positioning of the weights along the extensions of the beam when the pointer is level.

Usually, a larger weight on a lower beam extension is used to indicate increments of 50 pounds, or so, while a smaller weight on an upper beam extension is used to indicate increments of one pound or less. The lower beam extension often will have grooves indicating the position of each increment of 50 lbs., and the larger weight will lodge itself shallowly within a desired groove as the user slides the larger weight to a position of less than 50 lbs. of the user's estimated weight. By contrast, the upper beam extension often will not have grooves, but instead is smooth, with the increments printed on a face of the upper beam extension. The smaller weight likewise is smooth and includes an arrow indicating a center line that points to one of the increments printed on the face of the beam. The user's total weight is determined by adding the incremental reading of the larger weight to that of the smaller weight.

The operation of a conventional beam scale, as outlined above, has several shortcomings. Currently, conventional beam scales do not indicate clearly that the beam has been balanced in the holding bracket. A beam is considered balanced when it has stopped moving and has leveled out in the holding bracket. When the beam is balanced, it is has reached the weight of the user. Because conventional beam scale components, such as the holding bracket, are made often of fabricated metal, they are not transparent and they make loud clanking noises when users get on and off the scale. The clanking results as the components bang into each other as the shifting weight of the user causes the unbalanced beam to move rapidly upward on mounting the scale and rapidly downward on dismounting the scale. Also, the conventional level indicator typically has no indictor on the fabricated metal holding bracket. The user must estimate when the beam pointer is in line with the level indicator because the fabricated metal holding bracket obstructs the user's view of the pointer.

It would therefore be advantageous to have a beam scale with a transparent holding bracket with a level indicator that will allow the user to see the beam pointer through the holding bracket to facilitate comparison with the level indicator, and that will more quietly dampen the movement of the beam as the user mounts and dismounts the scale.

Furthermore, conventional beam scales have frames that require tools for final assembly. The use of tools complicates the construction of the scale and necessitates that a user have the required tools on hand whenever the scale is to be assembled or disassembled. The frame of the scale typically includes a base assembly, a pillar assembly, and a horn assembly. Prior to shipment of the scale from the manufacturer, the scale typically must be fully assembled, calibrated, and partially disassembled for shipment. Partial disassembly often includes separation of the base assembly from the pillar assembly using standard tools, including screwdrivers and wrenches. Likewise, when the scale is delivered, the purchaser must use tools to re-attach the pillar assembly to the base assembly and connect the levers of the weighing mechanism to re-assemble the scale. Insofar as the use of tools complicates the assembly, disassembly, and re-assembly process, manufacturing of the scale is more labor intensive.

It would therefore be desirable to design the pillar assembly and base assembly to quickly connect without the use of tools, resulting in a less labor intensive manufacturing process and providing a potential cost savings. Moreover, materials costs may be reduced if a quick connection mechanism is designed that is less expensive than the assembly components for which tools are required. An exemplary quick connection mechanism may include a bayonet-style, pin-in-groove mechanism.

Common scale designs are based on painted, stamped-metal or fabricated metal frames assembled using spot welding. Frame assemblies typically involve a multitude of parts, many requiring painting and sub-attachment. For example, a standard horn assembly calls for a spot-welded, stamped-metal head horn assembly, having front and back head pieces spot-welded together, with a separate beam stand cap having front and back pieces screwed or spot-welded to the head pieces. The beam stand cap houses the fulcrum and corresponding portion of the beam and may have a separate plastic cover. In addition, the holding bracket often is welded or screwed to the head pieces. Other sections of the frame similarly may have numerous-component assemblies. For instance, on the one hand, the pillar assembly may comprise several pieces welded together, while on the other hand, a separate plastic platform cover and a reinforcement plate may attach to a stamped or fabricated metal platform.

However, painting, spot welding, and the use of many components complicates and lengthens the assembly process. Simplification of the frame components, as well as their assembly, thus is desirable so as to eliminate the complication and expense associated with painting and welding the components, such as through the use of pigmented thermoformed plastic components. For example, it would be desirable to design a horn assembly combining the head horn and stand cap pieces into plastic front and back horn pieces encasing a beam support structure attached to the pillar assembly, the horn pieces bracing between themselves a plastic holding bracket. Additionally, the pillar assembly may be designed, for example, as an extruded tubular column having a quick connection mechanism at the base, while the platform may be simplified into a single piece of hard, pigmented thermoplastic or thermoset material.

Additionally, if wheels are present on a conventional scale, the wheels typically are hard plastic or metal, in part to support the heavy, fabricated metal scale, and relocation of the scale using the wheels can be a very noisy event, as, for example, the metal wheels squeak against a metal axis and the metal base. Such load and annoying noises are unwelcome, particularly in hospitals, where a scale may be moved frequently to weigh patients in different rooms, and the noises distress the hospital staff while waking sleeping patients. A beam scale having quiet wheels would be a welcome improvement over the conventional wheeled scales. For example, the wheels and ball-bearing rims commonly used on skateboards and in-line skates would be a readily available solution. Generally, the quiet wheels possibly could made of medium-rigidity polymers.

Optionally, many conventional beam scales include separate height rods that are used to measure the height of the user. Typically, the height rod is assembled separately with extra attachments, which are exposed on the exterior of the scale, i.e., metal brackets, screws, and bolts. The height rod commonly is raised, a measuring arm is placed on the user's head at its highest point, and the measurement is taken. The measurement is read by identifying the height number on the height rod that correlates with the position of the measuring arm. This reading can be inaccurate because the measuring arm and the height numbers do not always line up, the measuring arm may move before the correlating height number is identified, or the correlating height number may be obscured when the user seeks to identify it.

Therefore, it would be advantageous to design a height rod and measuring arm that do not require hardware or separate receiving brackets for assembly, by incorporating their attachment means into the design of the pillar, and that facilitate more accurate measurement readings, by having height numbers align directly with the measuring arm and placing on the measuring arm a transparent height-measuring window having a line indicator to allow the user to see the exact height numbers.

As alluded to above, many beam scales are used in hospitals and doctor's offices for the measurement of patients' weights. Characteristic of many patients under the treatment of healthcare professionals, the user of the beam scale may have difficulty ambulating or remaining in a standing position without support. This may be particularly true with elderly patients who may require frequent weighing as part of their diagnostic monitoring. As such, the user may need to brace herself against something while being weighed. It would therefore be desirable to design a beam scale having support handle bars that maybe easily attached and detached from the frame of the scale. Preferably, the user could brace herself against the support handle bars without altering the accuracy of the weight measurement.

SUMMARY OF THE INVENTION

The present invention is directed to a beam scale for measurement of body weight and height. A beam scale for measurement of body weight and height according to the present invention may comprise: a scale frame having a base assembly, a pillar assembly, and a horn assembly; and a weighing mechanism. The horn assembly may include a transparent holding bracket having a level indicator. The scale may include a height measurement assembly having a height rod incorporated in the horn assembly and the pillar assembly, and a measuring arm having a transparent height-measuring window having a line indicator. The scale frame may include a quick assembly mechanism, such as bayonet-style locking pins, that secure the pillar assembly to the base assembly, permitting the final assembly of the frame to be accomplished without the use of tools. The horn assembly incorporates a head horn assembly and a beam stand cap assembly into one assembly having a front horn piece and a back horn piece made of thermoplastic or thermoset material, eliminating the need for a separate plastic formed cover. The platform may be formed by a single piece of thermoplastic or thermoset material, eliminating the need for a separate platform cover, and having one of a variety of devices to allow the weighing mechanism to be attached, such as molded threaded inserts, press-in inserts, in-molded inserts, or self-tapping screws. Wheels having sound-dampening means may be arranged on the base assembly. Support handle bars may be added as a easily removable accessory. The thermoplastic or thermoset materials used may contain pigment, eliminating the need to paint the frame, and may be molded to include texture.

Other features and advantages of the present invention will be apparent from the following description of the exemplary embodiments thereof, and from the claims.

DETAILED DESCRIPTION

Figure 1:
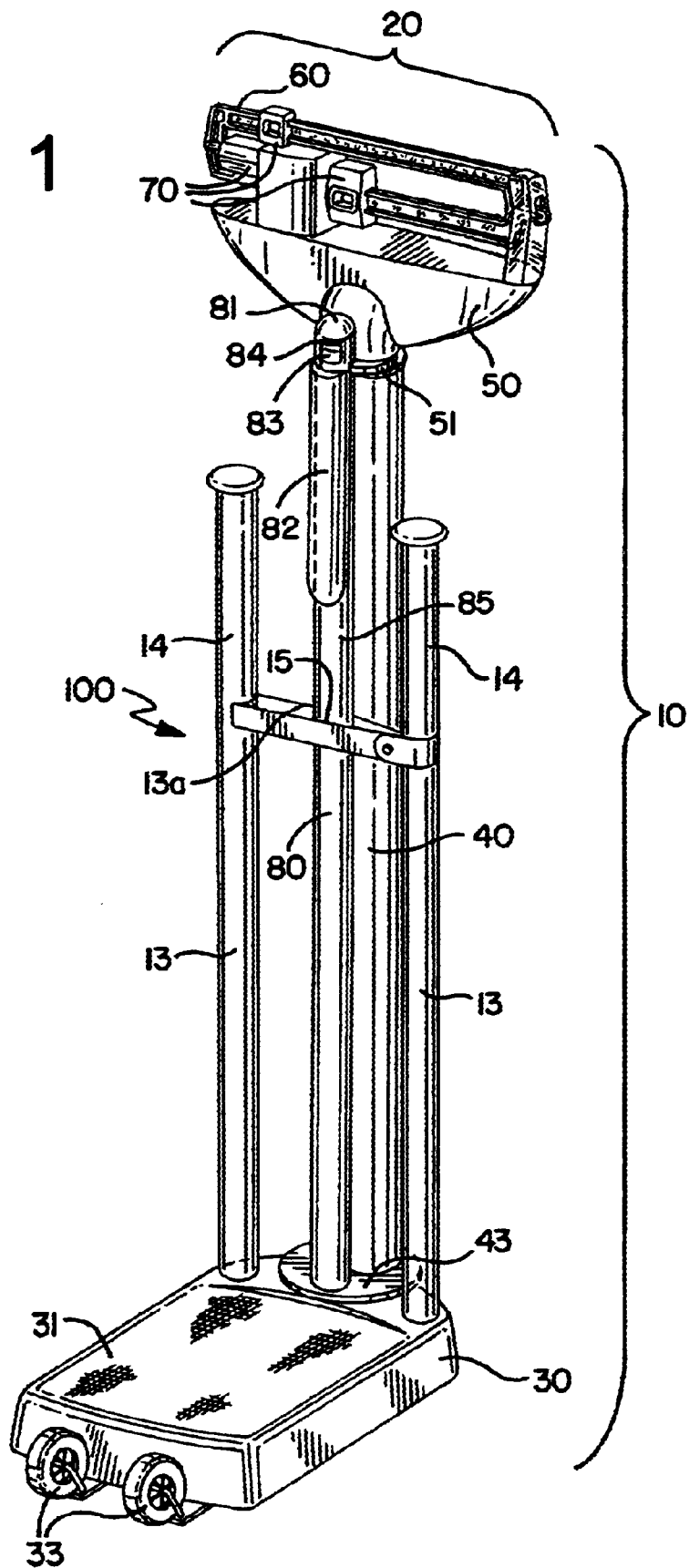
FIG. 1 is a perspective view of an exemplary embodiment of a beam scale according to the present invention.

A beam scale 100 for measurement of body weight and height according to the present invention is shown FIG. 1. The beam scale 100 may include a frame 10 and a weighing mechanism 20. The frame 10 may include a base assembly 30, a pillar assembly 40, and a horn assembly 50. The weighing mechanism 20 may include a beam 60, weights 70, and a lever assembly (not shown) that is housed within the frame 10. Optionally, the scale 100 further may include a height measurement assembly 80.

The frame 10 may include a quick assembly mechanism 11, such as bayonet-style locking pins 12 (shown in FIG. 4A), that secures the pillar assembly 40 to the base assembly 30 during final assembly, permitting the final assembly of the frame 10 to be accomplished without the use of tools. Other possible quick assembly mechanisms 11 include the assortment of snap-lock, deflecting-tab, and spring-clip engagements known in the art. However, it is preferable that the quick assembly mechanism 11 also be easily disassembled without the use of tools, so a snap-lock or spring-clip engagement preferably would have a manual release mechanism that is not hidden by the base assembly 30.

Figure 4A:
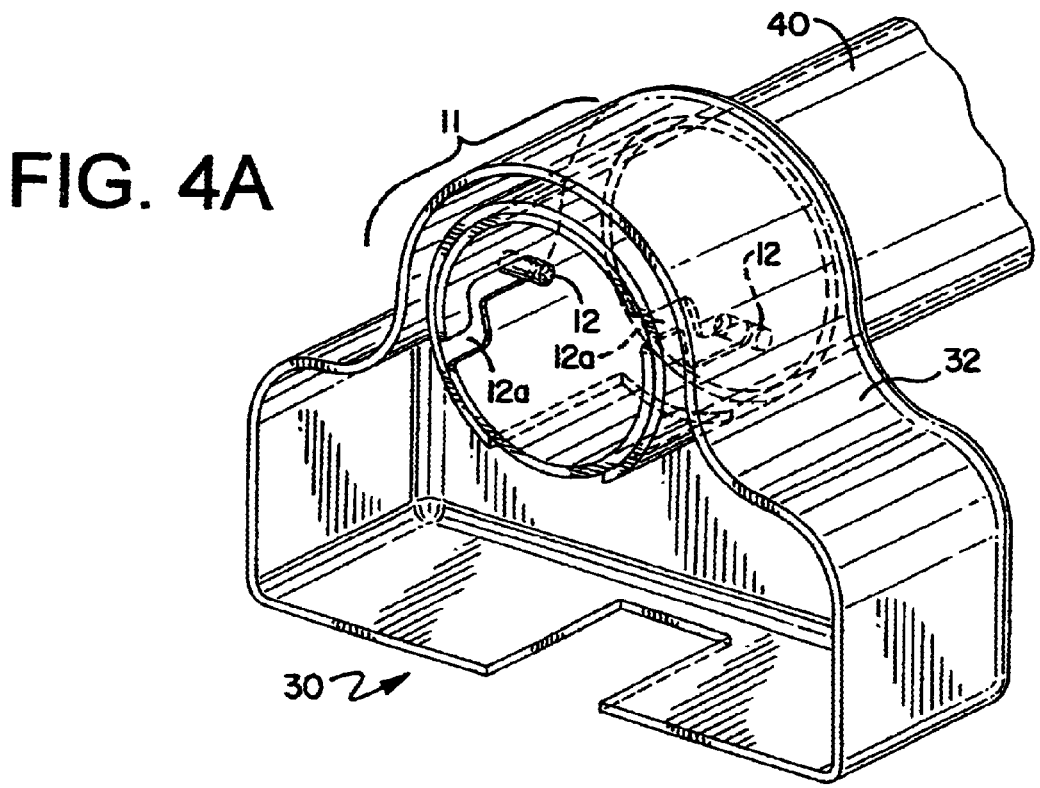
FIG. 4A is an perspective view of a quick assembly mechanism according to an exemplary embodiment of the present invention.
Figure 4B:
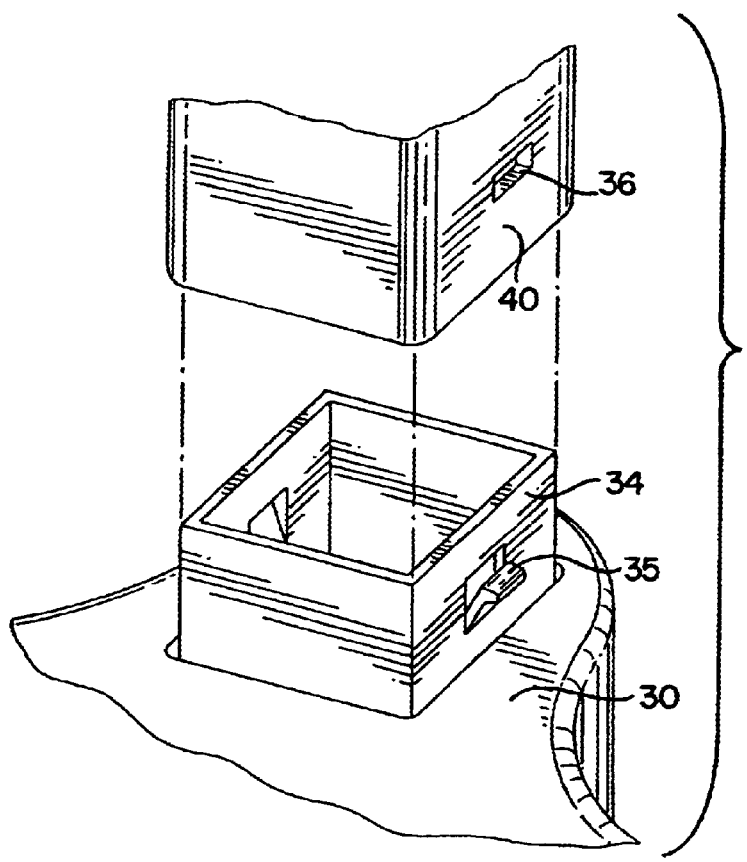
FIGS. 4B–4C are a perspective view and a plan view, respectively, of another quick assembly mechanism according to an exemplary embodiment of the present invention.
Figure 4C:
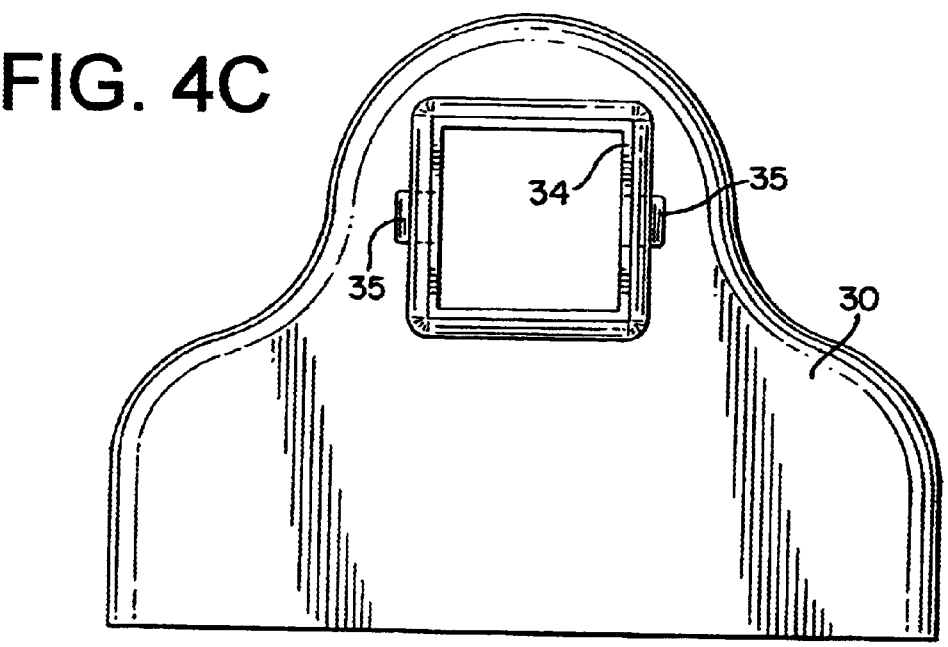

For example, as shown in FIGS. 4B–4C, the base assembly 30 may include an internal stem 34 that fits within the pillar assembly 40. The internal stem 34 may include a spring-clip engagement 35 that engages a hole 36 on the pillar assembly 40, the hole 36 not being hidden by the base assembly 30. Attaching the pillar assembly 40 to the base assembly 30 would involve inserting the internal stem 34 into the pillar assembly 40 and aligning the spring-clip engagement 35 with the hole 36. Detaching the pillar assembly 40 from the base assembly 30 would involve depressing the spring-clip engagement 35 out of the hole 36 and removing the internal stem 34 from the pillar assembly 40.

Moreover, the extensive use of thermoplastic or thermoset materials throughout the frame 10 significantly reduces the weight and cost of the scale 100 as compared with a conventional scale made primarily of fabricated metal. The thermoplastic or thermoset material used may contain pigment, eliminating the need to paint the frame, and may be molded to include texture, eliminating the need to overmold fabricated metal components of a conventional scale, both reducing overall manufacturing costs of the scale 100.

The base assembly 30 may include a platform 31 and a foundation 32 (part of which is shown in FIG. 4A). The platform 31 is positioned above the foundation 32 and suspended by the lever assembly. The lever assembly transfers the force exerted on the platform 31 through the pillar assembly 40 to the beam 60. When a user mounts the platform 31, the user's weight forces the platform 31 down, causing the lever assembly to exert force on the beam 60, unbalancing the beam 60 relative to the weights 70. The foundation 32 supports and attaches to the pillar assembly 40, as shown for example in FIG. 4A. The platform 31 may be formed by a single piece of hard, strong thermoplastic or thermoset material, eliminating the need for a separate platform cover, and being attached on the underside to the weighing mechanism 20. The foundation 32 may be formed of a suitably strong material, such as fabricated metal or molded hard, strong thermoplastic or thermoset material.

A pair of wheels 33 may be included on the base assembly 30, such as on axes (not shown) on a front side or, preferably, a rear side of the foundation 32, to facilitate transportation of the scale 100. If one pair of wheels 33 are used, the scale 100 must be tilted onto the wheels 33 to be moved. The pair of wheels 33 shown in FIG. 1 appear on the front side to make them readily visible, but preferably, the pair of wheels 33 would be arranged on the rear side, because tilting the scale 100 backwards to move it is easier than tilting it forwards. If two pairs of wheels 33 are used, the wheels 33 must either be lockable to prevent rolling of the scale 100, or connected to a hoist mechanism (not shown) that lifts the scale 100 onto the wheels 33 during transportation and lowers the scale 100 for parking. The wheels 33 may be replaced with casters if desired. The wheels 33 include sound-dampening means (not shown) to facilitate quiet rolling of the scale 100. The sound-dampening means may include, for example, a wider wheel face, to reduce lateral vibration of the wheel during movement; ball-bearing interfaces between the wheels 33 and their axes, to reduce friction and vibration; and the use of thermoplastic or thermoset construction, to avoid metal-on-metal impact. Exemplary wheels 33 having appropriate sound-dampening means may include ball-bearing rims and plastic treads of the sorts commonly used on skateboards or in-line skates, as are depicted in FIG. 1.

The pillar assembly 40 in turn supports the horn assembly 50, and the horn assembly 50 supports the beam 60 and the weights 70. The pillar assembly 40 acts to support the beam 60 and weights 70 above the platform 31 to enable a standing adult user to adjust the weights 70 to balance the beam without bending over. The pillar assembly 40 may comprise a hollow pillar piece or a pair of mating pillar pieces. The pillar assembly 40 may be extruded, molded, carved or stamped, using any suitably strong material, such as metal, wood or pigmented thermoplastic or thermoset material. Depending on the method of fabrication, the pillar assembly may be made to have any one of numerous appearances. For example, the pillar assembly 40 may be a hollow pillar piece molded into a shape of a Greco-Roman column using a marble-pigmented, rigid thermoplastic or thermoset material. The choice of quick connection mechanism 11 between the pillar assembly 40 and the base assembly 30 likely would influence the manufacture of the pillar assembly 40. The pillar assembly 40 also may support the height measurement assembly 80.

Figure 6:
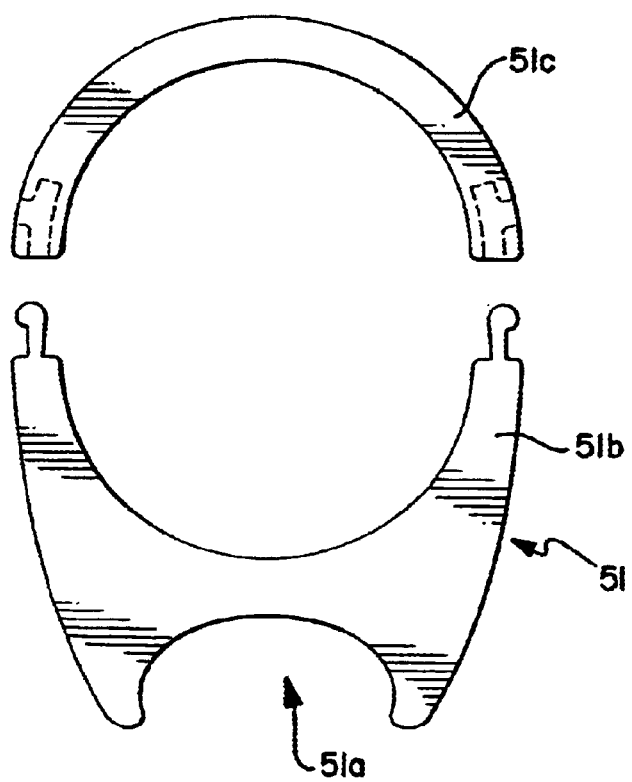
FIG. 6 is a top plan view of a ring to support a sheath according to an exemplary embodiment of the present invention.

The height measurement assembly 80 may include a height rod 81, a measuring arm 82, a transparent height-measuring window 83, and a line indicator 84 on the measuring window 83. The height rod 81 slides into a sheath 85 arranged parallel to the pillar assembly 40. The sheath 85 is supported at a lower end by a pillar ledge 43 having a sheath socket 44 in which the sheath 85 rests. The pillar ledge 43 is supported by the pillar assembly 40 or the foundation 32 and is independent of the platform 31. The sheath 85 is supported at an upper end by a ring 51 (shown in more detail in FIG. 6) having a partial collar 51a into which the sheath 85 snaps. Insofar as the height measurement assembly 80 may be sold as a separate accessory, it should attach easily to the frame 10, but not in a way that would detract from the appearance of the frame 10 in the absence of the height measurement assembly 80. Likewise, the ring 51 may include a front half 51b and a back half 51c that mate within a stylistic annular groove around the horn assembly 50. The front and back halves 51b and 51c may mate using a snap-lock engagement, for example. As a result, no metal brackets or screws are required to attach either the height rod 81, the sheath 85, or the ring 51 to the scale 100.

Figure 7:
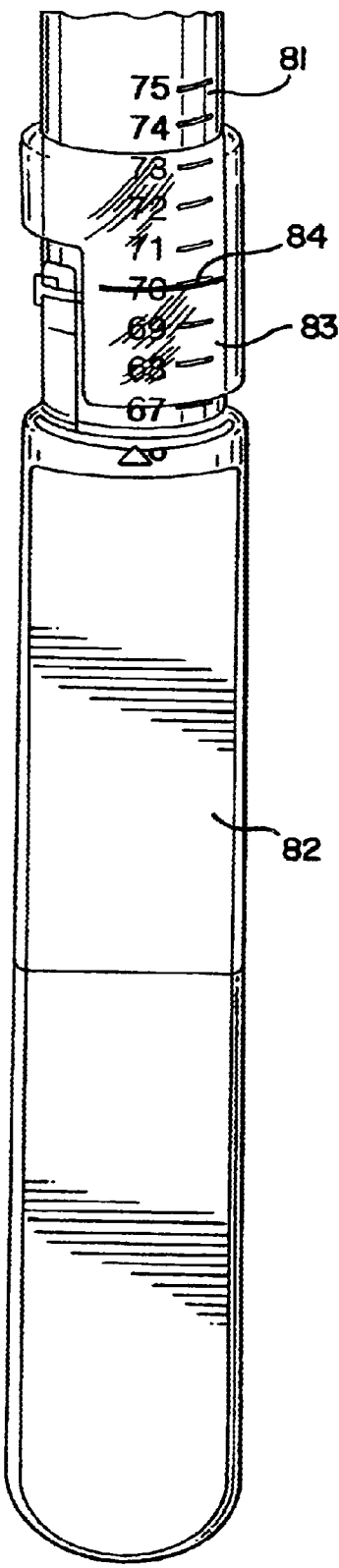
FIG. 7 is a front elevational view of a height rod, a measuring arm, and a transparent height-measuring window, all according to an exemplary embodiment of the present invention.

With the height measurement assembly 80 in place, the measuring arm 82 may be adjusted vertically to the user's height. Referring to FIG. 7, a height rod 81 is shown with a measuring arm 82 and a transparent height-measuring window 83. Height numbers may appear on a face of the sheath 85 as well as on the face of the height rod 81. When the measuring arm 82 is squarely above the head of the user, the user's height may be read by looking through the transparent height-measuring window 83 and identifying the height number in line with the line indicator 84 on the measuring window 83. Using the transparent height measuring window 83 permits the user to more accurately identify the height numbers correlating to the user's height because the correlating height numbers are not obscured by the measuring arm 82, as is often the case with prior art scales.

Because some short user's, such as children, may be shorter than the sheath 85 itself, the measuring arm 82 is designed to slide along the sheath 85 as well as along the height rod 81. Therefore, height numbers on the sheath 85 begin at a height of around 25 inches and increase vertically along the face of the sheath 85, which is often 50 inches long. However, for users taller than 50 inches, the height rod 81 must be extended telescopically from the sheath 85 to increase the vertical range of measuring arm 82. Typically, height rods 81 are extended to the height of the user, and the height numbers on the height rod 81 increase from top to bottom, instead of bottom to top as with the height numbers on the sheath 85. With this juxtaposed arrangement of height numbers, the height number correlating to the user's height is juxtaposed with the intersection of the height rod 81 and the sheath 85, assuming that the measuring arm 82 is at the top of the height rod 81 and resting against the user's head. This juxtaposed arrangement of height numbers may be counterintuitive for some users and may complicate the process. To alleviate some of this potential confusion, the transparent height measuring window 83 would move with the measuring arm 82 below the seam of the sheath 85 and the height rod 81, but the window 83 would stop at the seam when the measuring arm 82 moves above the seam, thereby indicating to the user where to look for the height measurement.

Moreover, the height numbers may be arranged in a more user-friendly manner than previously the case. By reversing the standard numbering pattern on the height rod 81, the height numbers on the height rod 81 will also increase from bottom to top, as is the case with the height numbers on the sheath 85. Using this progressive arrangement of height numbers, the height rod 81 must be extended fully from the sheath 85 and lock temporarily in place so that the height numbers do not skip ahead between the sheath 85 and the height rod 81. Any common snap-lock, spring clip, or similarly releasable locking mechanism may be used to temporarily lock the height rod 81 in place at the top of the sheath 85.

Once the height rod 81 is fully extended and locked in place, the height numbers increase continuously from bottom to top, thereby causing the height of the user to directly correlate to the height number located immediately behind the measuring arm 82. This progressive arrangement may be more intuitive for some users and may simplify the height measurement process. Furthermore, because the user's height always correlates to the height number immediately behind the measuring arm 82 when using the progressive arrangement, the measuring arm 82 may be attached directly to the transparent height measuring window 83, and the two would travel together from the sheath 85 to the height rod 81. Thus, when the measuring arm 82 rests on the user's head, the transparent height measuring window 83 would encompass a section of the height numbers and the line indicator 84 would demarcate the height number correlating to the user's height.

Figure 5A:
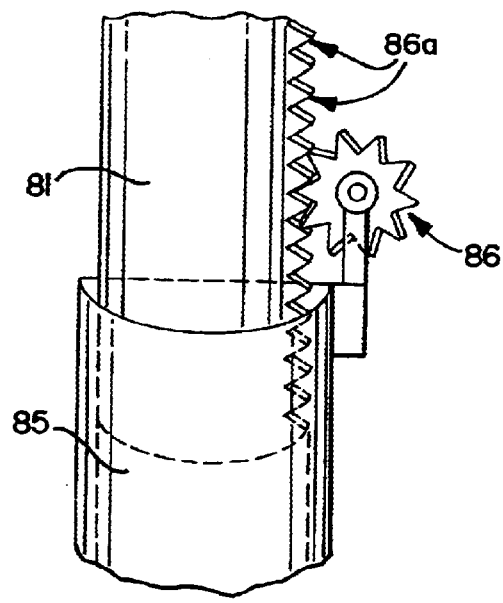
FIGS. 5A–5C are enlarged perspective views of a support device according to exemplary embodiments of the present invention.
Figure 5B:
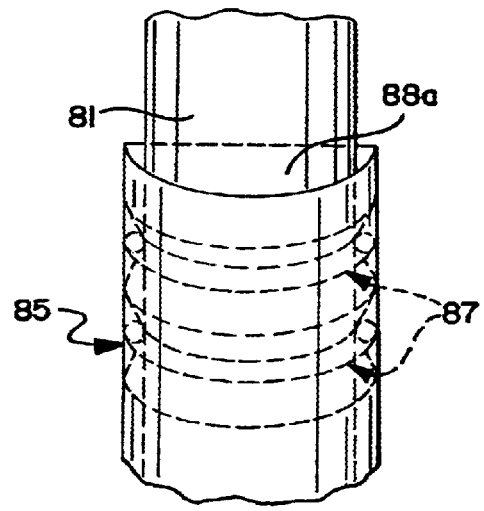

Whether using the juxtaposed arrangement of height numbers or the progressive arrangement, it may be desirable to prevent the height rod 81 from freely falling into the sheath 85 in the absence of the user holding it. At the upper end of the sheath 85, there may be a support device 86 (shown in FIGS. 5A–5C) to engage the height rod 81 and the sheath 85. While measuring the user's height using the juxtaposed arrangement, the user may extend the height rod 81 partially from the sheath 85, and the support device 86 would keep the height rod 81 in this extended position. Any suitable cog, spring, counterbalance, magnetic, or friction mechanism known in the art may be used as the support device 86. If necessary, a corresponding support component 86a may be arranged on the height rod 81 to engage the support device 86. The support device 86, for example, may create friction between the support device 86 and the height rod 81. The friction would be enough to support the height rod 81, which may be made of a lightweight, rigid thermoplastic or thermoset material, but not enough to resist movement of the height rod 81 under mild pressure. For example, as shown in FIG. 5B, the support device 86 may include one or more stationary polymer washers 87 pressing against the height rod 81. The height rod 81 likely may have a smooth surface 88a, facilitating the movement of the height rod 81 past the washers without dislodging the washers 87.

Figure 5C:
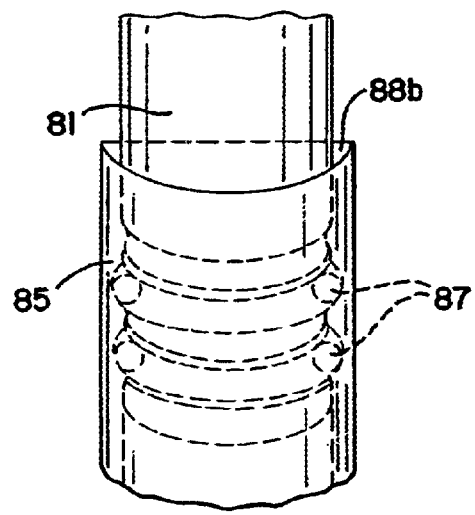

Alternatively, the support device 86 may be attached to the height rod 81 near the lower end, and the support device 86 may engage the sheath 85 near the upper end, as shown in FIG. 5C. In this event, the sheath 85 may include, if necessary, a corresponding support component 86a to engage the support device 86 arranged on the height rod 81. For example, one or more stationary washers 87 may be arranged at or near the lower end of the height rod 81, and the washers 87 may slide against a smooth surface 88b inside the sheath 85.

Figure 2:
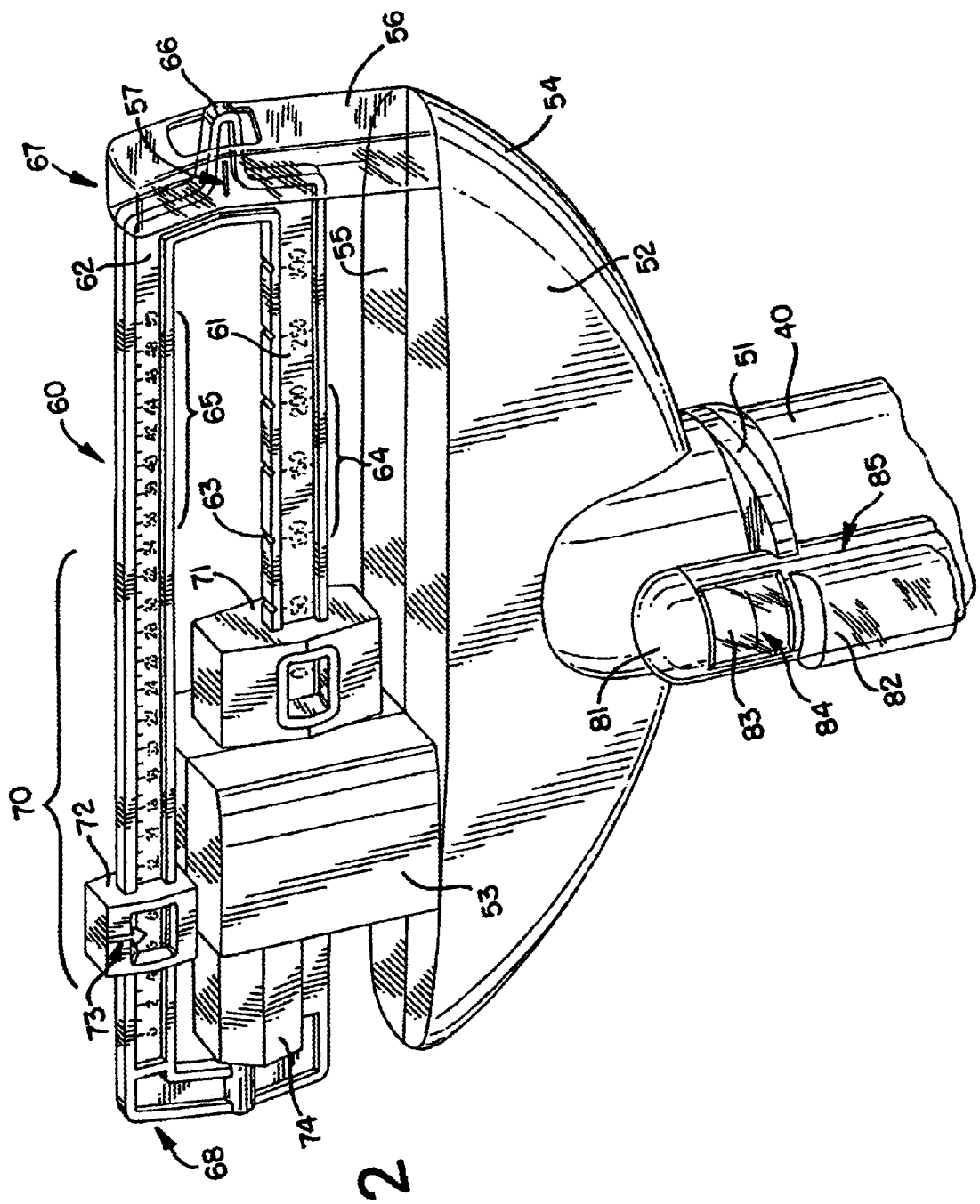
FIG. 2 is a perspective view of a horn assembly according to an exemplary embodiment of the present invention.

As shown in greater detail in FIG. 2, the horn assembly 50 may incorporate a head horn portion 52 and a beam stand cap portion 53 in a single assembly having a front horn piece 54 and a back horn piece 55, made of thermoplastic or thermoset material, eliminating the need for separate head horn and bean stand cap assemblies. Within the horn assembly 50 is a beam support structure (not shown) to support the balancing components of the weighing mechanism 20, i.e., the beam 60 and the weights 70. The beam support structure is attached to the pillar assembly 40 for stability. The horn assembly 50 encases and attaches to the beam support structure. The beam support structure also offsets the fulcrum (not shown), and thus the leverage, of the lever mechanism off-center from the pillar assembly 40. Hence, the beam stand cap portion 53 is off-center relative to the pillar assembly 40. This off-set allows the user to balance the beam 60 with the weights 70 in front of the user, instead of to the user's side, for the sake of convenience.

FIG. 2 additionally depicts the visible aspects of the weighing mechanism 20, namely the beam 60 and the weights 70. The beam 60 may include a lower beam extension 61 used to indicate increments 64 of 50 pounds, and an upper beam extension 62 is used to indicate increments 65 of one pound or less. The weights 70 may include a larger weight 71 arranged on the lower beam extension 61 and a smaller weight 72 arranged on the upper beam extension 62. The lower beam extension 61 may have grooves 63 indicating the position of each increment 64 of 50 lbs., and the larger weight 71 may lodge itself shallowly within a desired groove 63 as the user slides the larger weight 71 to a position of less than 50 lbs. of the user's estimated weight. By contrast, the upper beam extension 62 may not have grooves, but instead may be smooth, with the increments 65 printed on a face of the upper beam extension 62. The smaller weight 72 likewise may be smooth and include an arrow 73 indicating a center line that points to one of the increments 65 printed on the face of the beam 60. The user's total weight is determined by adding the incremental reading of the larger weight 71 to that of the smaller weight 72.

The beam 60 may have a pointer 66 at a far end 67 within a transparent holding bracket 56. Between the far end 67 and a near end 68, the beam 60 may rest on a fulcrum (not shown) arranged within the beam stand cap portion 53, with the mass of the longer side of the beam toward the far end 67 being offset by an adjustable counterweight 74 on the near end 68. The lower beam extension 61 may pass through the beam stand cap portion 53, as shown in FIG. 2, in order to pivot on the fulcrum arranged therein. On the near end 68 of the lower beam extension 61 past the fulcrum, the lever assembly (not shown) is attached, permitting free transference of force from the platform 31 to the beam 60 that is critical to accurate weighing.

Figure 3:
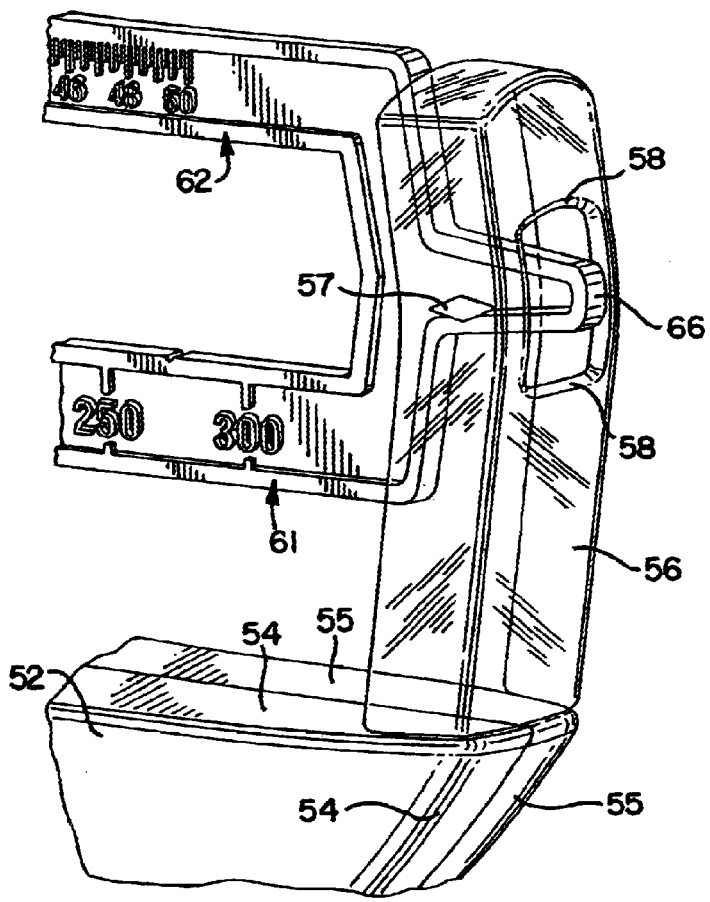
FIG. 3 is an enlarged perspective view of a transparent holding bracket according to an exemplary embodiment of the present invention.

Referring to FIG. 3, a transparent holding bracket 56 is shown enlarged, having a level indicator 57. The transparent holding bracket 56 limits the range of motion of the beam 60, limiting the swing of the beam 60 as the user mounts the platform 31. In particular, the pointer 66 is restricted by edges 58 that bound the opening of the bracket 56. In order for the bracket to be transparent, it must be made of either strong glass, crystal, or, preferably, a transparent polymer. Insofar as the bracket 56 is not made of metal, the impact of the beam 60 and the bracket 56 does not make a loud clanking sound. Furthermore, use of a soft, shock-absorbent and transparent polymer will reduce the sound even more. The pointer 66, and the beam 60 more generally, also may be made of or coated by a rubber or polymer, further reducing the potential sound generated. The transparency of the bracket 56 permits direct viewing of the beam 60 during the balancing process, allowing for a more accurate measurement as the level indicator 57 is lined up with the beam 60. The level indicator 57 may comprise a fine horizontal hash line at zero degrees inclination from the horizontal axis.

As mentioned above and shown in FIG. 4A, the frame 10 may include a quick assembly mechanism 11, such as bayonet-style locking pins 12, to secure the pillar assembly 40 to the base assembly 30 during final assembly, permitting the final assembly of the frame 10 to be done without the use of tools. Avoiding the need to use tools permits the scale 100 to be finally assembled and partially disassembled on a moment's notice. The pins 12 may be made preferably of either hard plastic or metal, by such as by extrusion. The pins 12 may be fashioned to lock within corresponding slots 12a rising up from the lower rim of the pillar assembly 40, securing the pillar assembly 40 to the foundation 32.

Another exemplary quick assembly mechanism 11 includes the use of a buckle mechanism between the pillar assembly 40 and the base assembly 30, the buckle mechanism having corresponding components on either side of the joint. A similar buckle mechanism, for example, is used often on musical instrument cases as a closure means. For a potentially tighter closure, an adjustable buckle mechanism, similar to those used in snowboard boot bindings, may be implemented as well. Moreover, many other snap-lock, twist-lock, and adjustable-tension connection means not requiring tools are known in the art and may be implemented in the present invention based on design and cost prerogatives.

As an a accessory to an exemplary beam scale according the present invention, one or two support handle bars 13 may be attached to the frame 10. The handle bars 13 may have any suitably hard and strong construction, but preferably would be made of molded hard plastic. The handle bars 13 may be free standing at the upper end and attached to the base assembly 30 at the lower end. The handle bars 13 should not interfere with the free movement of the platform 31 necessary for accurate weighing, so holes (not shown) may be pre-bored in the platform 31 through which the bars 13 are to be inserted into sockets (not shown) in the foundation 32. Avoiding attachment of the bars 13 to the platform 31 also avoids the need to tare the weighing mechanism 20 for the bars 13. However, if the bars 13 are made permanent, they may be attached to platform 31, requiring the weighing mechanism 20 be tared. When not in use, the bars 13 otherwise may be removed and the holes may be concealed with plugs (not shown) flush with the surface of the platform 31.

If using two handle bars 13, a cross beam 13a may straddle the bars 13 to brace one against the other near the upper end. The cross beam 13a may be removably, hingedly or fixedly attached to the two handle bars 13. For example, a hingedly attached cross beam 13a may allow the bars 13 to fold towards each other for storage. The handle bars 13 may be designed to be easily attached and detached from the frame 10 of the scale 100 using any one of numerous locking attachments (not shown) known in the art, such as threaded grooves, chamfer detents, snap-lock or snap-on attachments, taking into account, for example, whether a cross beam 13a prevents individual rotation of two connection bars 13. For example, the handle bars 13 may have protrusions (not shown) that lock into concealed receiving holes (not shown) in the base assembly 30 in the event that the bars 13 cannot be rotated separately.

Of course, because the handle bars 13 are intended to support an unstable user, the handle bars 13 would need to be securely attached when in use and not disengage their locking attachment mechanisms simply because vertical or lateral force is applied to the handle bars 13 themselves. Therefore, the locking attachment mechanisms preferably would require application of pressure at a specific point, such as a release button. Alternatively, the handle bars 13 may form a collar attachment (not shown), also having a releasable locking attachment mechanism, that encircles the pillar assembly 40 at the upper end, for added stability. Because the pillar assembly is not attached to the platform 31 and does not interfere with the weighing mechanism 20, attachment of the bars 13 to the pillar assembly 40 also would not interfere with the weighing mechanism 20.

Preferably, the user could brace herself against the support handle bars 13 without altering the accuracy of the weight measurement. This might be achieved by attaching the handle bars 13 to the foundation 32, on the one hand, and by configuring the handle bars 13 to present the user with a choice between a vertical grip 14 and a horizontal grip 15, on the other hand. The vertical grip 14 would allow the user to stabilize herself, without partially transferring her weight from the platform 31 to the handle bars 13. A horizontal grip 15 would allow the weaker users to lean against the handle bars 13, but this may affect the weight measurement. Handle bars 13 having a right angle bend, such as with a cross beam 13a shown in FIG. 1, would provide the user the choice of either gripping vertically or horizontally.

A number of embodiments of the present invention have been described above. Nevertheless, it will be understood that various modifications may be made without departing from the spirit and scope of the invention. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention herein described and all statements of the scope of the invention, expressed or implied.

What is claimed is:

1. A beam scale comprising:

a frame including a base assembly, a pillar assembly attached to the base assembly, and a horn assembly attached to the pillar assembly; the horn assembly including a transparent holding bracket having a level indicator;

a weighing mechanism including a beam, weights, and a lever assembly, the weighing mechanism housed in the frame and having a pointer extending from the beam, wherein the pointer has an exposed surface, and the exposed surface is made of one of a semi-pliable plastic or rubber; and, wherein the transparent holding bracket bounds the pointer and limits the motion of the beam.

2. The beam scale of claim 1, wherein the transparent holding bracket includes at least one of glass, crystal, and plastic.

3. The beam scale of claim 2, wherein the plastic comprises a clear, medium-rigidity thermoplastic.

4. A beam scale comprising:

a frame including a base assembly, a pillar assembly attached to the base assembly, and a horn assembly attached to the pillar assembly; the horn assembly including a transparent holding bracket having a level indicator;

a weighing mechanism including a beam, weights, and a lever assembly, the weighing mechanism housed in the frame and having a pointer extending from the beam, wherein the beam has an exposed surface, and the exposed surface is made of one of a semi-pliable plastic or rubber; and, wherein the transparent holding bracket bounds the pointer and limits the motion of the beam.

5. A beam scale comprising:

a frame including a base assembly, a pillar assembly, a horn assembly, and at least one handle bar; and a weighing mechanism including a beam, weights, and a lever assembly, the weighing mechanism housed in the frame;

the base assembly having a platform and a foundation underlying the platform;

the at least one handle bar being attached to one of the platform and the foundation;

the pillar assembly being attached to the foundation; and the horn assembly being attached to the pillar assembly.

wherein the at least one handle bar releasably attaches to the foundation by a releasable locking attachment mechanism, extends through an opening in the platform, and avoids contact with the platform that would interfere with the weighing mechanism.

* * * * *

UNITED STATES PATENT AND TRADEMARK OFFICE
CERTIFICATE OF CORRECTION

PATENT NO. : 6,646,209 B2
DATED : November 11, 2003
INVENTOR(S) : Montagnino et al.

It is certified that error appears in the above-identified patent and that said Letters Patent is hereby corrected as shown below:

Column 2,
Line 8, after "it" and before "has" delete "is"

Column 4,
Line 38, change "a" to -- an --
Line 51, change "an" to -- a --

Column 5,
Line 7, after the word "shown" insert -- in --

Column 7,
Line 16, change "user's" to -- users --

Column 9,
Line 55, after "metal," and before "such" delete "by"

Column 10,
Line 5, delete "a"

Signed and Sealed this

Twelfth Day of October, 2004

JON W. DUDAS
*Director of the United States Patent and Trademark Office*